United States Patent [19]

Majerus et al.

[11] Patent Number: 5,185,960
[45] Date of Patent: Feb. 16, 1993

[54] TREAD BUFFING APPARATUS

[75] Inventors: Norbert Majerus, Akron; Arthur W. Magee, Norton; Michael D. Hickman, Alliance; Gary C. Parrish, Uniontown; Timothy M. Rooney, Munroe Falls; Lawrence E. Chlebina, Akron, all of Ohio

[73] Assignee: The Goodyear Tire & Rubber Company, Akron, Ohio

[21] Appl. No.: 833,208

[22] Filed: Feb. 10, 1992

Related U.S. Application Data

[62] Division of Ser. No. 550,265, Jul. 6, 1990.

[51] Int. Cl.$^5$ ............... B24B 5/36; B29D 30/68
[52] U.S. Cl. .................... 51/104; 51/118; 51/DIG. 33; 157/13
[58] Field of Search ............ 51/104, 106 R, 281 R, 51/289 R, 324, 326, 327, 328, DIG. 33, 72 R, 80 R, 88, 117, 118; 157/13

[56] References Cited

U.S. PATENT DOCUMENTS

| | | | |
|---|---|---|---|
| 2,321,936 | 4/1941 | Pollack | 157/13 |
| 2,597,256 | 5/1952 | Murray | 51/135 BT |
| 2,864,445 | 12/1958 | Hawkinson | 157/13 |
| 2,915,113 | 12/1959 | Van Sickle et al. | 157/13 |
| 2,939,520 | 6/1960 | Frohlich et al. | 157/13 |
| 3,478,804 | 11/1969 | Meixner | 157/13 |
| 3,841,033 | 10/1974 | Appleby et al. | 51/289 R |
| 3,867,792 | 2/1975 | Pelletier | 51/33 W |
| 3,877,506 | 4/1975 | Mattox et al | 157/13 |
| 3,910,337 | 10/1975 | Pelletier | 51/DIG. 33 |
| 3,925,129 | 12/1975 | Blankenship | 156/96 |
| 3,953,915 | 5/1976 | Fawcett et al. | 407/46 |
| 3,953,942 | 5/1976 | Nisimura | 51/33 W |
| 3,976,532 | 8/1976 | Barefoot | 156/406.2 |
| 3,987,834 | 10/1976 | Hopple et al. | 157/13 |
| 4,036,677 | 7/1977 | Marangoni | 156/421.6 |
| 4,116,256 | 9/1978 | Morris et al. | 157/13 |
| 4,268,998 | 5/1981 | Hansen | 51/148 |
| 4,490,197 | 12/1984 | Bajer | 156/64 |

FOREIGN PATENT DOCUMENTS 0130759  1/1985  European Pat. Off.
1139480 12/1955  France.

OTHER PUBLICATIONS

European Search Report dated May 12, 1985, Application No. 0130759.
European Search Report dated Oct. 29, 1991, Application EP 91 11 0622.

Primary Examiner—Bruce M. Kisliuk
Assistant Examiner—Bryan S. Reichenbach
Attorney, Agent, or Firm—David L. King

[57] ABSTRACT

A method and apparatus for buffing a tread is described. The method comprises mounting a tread on an apparatus capable of bufffing the casing engaging surface of said tread, the apparatus buffing the tread such that the grooves are formed on the buffed tread surface. The grooves angularly intercept a tread edge.

18 Claims, 10 Drawing Sheets

TREAD BUFFING APPARATUS

This is a division of pending application Ser. No. 07/550,265 filed Jul. 6, 1990.

BACKGROUND OF THE INVENTION

This invention relates to a method and apparatus for buffing a tread to roughen its surface. The inner casing contacting surfaces of the tread are buffed such that the roughened surface provides a means for evacuation of entrapped air when mounted to a prepared tire casing.

In the mounting of replacement treads on a tire casing it is known in the art to buff the surface of the casing, removing the worn tread and roughening the remaining surface. This roughening of the casing improves the adhesion of a cushion layer of unvulcanized rubber is layered on and cemented to the cushion layer. This assembly is then cured.

It has been determined that a roughening of a casing contacting precured tread surface prior to cementing to the cushion layer improves the tread adhesion. The roughening procedure, commonly called buffing, is accomplished by the use of wire wheels. The wheels remove oxidized rubber and increase the surface area to be bonded, thus improving bonding characteristics. Conventional buffing of the casing and the precured tread were directed circumferentially creating minute grooves around the circumferential surface of the tread and the casing. These grooves provide areas where air can be entrapped. The grooves act as tiny seals and prevent air from being removed during assembly, and entrapped air weakens the bonding of the tread to the casing.

In the past, various means have been utilized to insure that entrapped air is evacuated from between the tread and the cushion layer. The placement of vent cords between the tread and the cushion layer is one example.

With regard to winged treads, trials have shown that circumferentially buffing at the inner curvature of the wing did not produce a uniform buff. Uniformity of buffing being important to bond quality required that an alternative method be developed.

It is the purpose of this invention to provide a method and apparatus for buffing a precured tread wherein the resulting roughened tread surfaces provides a means for improved air evacuation and an improved bond. This is accomplished by insuring that at least a portion of the roughened grooves terminate at the tread edges, thus providing a means for air evacuation.

It is a further purpose of this invention to describe and illustrate a method and apparatus for uniformly buffing a precured wing tread whereby the inner surfaces of the wings are uniformly roughened such that the grooves extend to a tread edge.

RELATED ART

Hopple, in U.S. Pat. No. 3,987,834, issued Oct. 26, 1976, illustrates a Tire Buffing Apparatus and Method. The patent shows the concept of removing the tread rubber from a tire and roughening the casing surface.

Morris, in U.S. Pat. No. 4,116,256, issued Sep. 26, 1978, also shows an apparatus for preparing the peripheral surface of a tire casing. The apparatus illustrates the use of a pivotal tire mount such that circumferential buffing of the casing can be accomplished across the tread to the shoulder region of the casing.

Neal, in U.S. Pat. No. 4,088,521, issued May 9, 1978, describes a method of retreading a tire with an endless premolded tread wherein the inner surface of the tread is buffed prior to being mounted to the casing.

Bajer, in U.S. Pat. No. 4,490,197, issued Dec. 25, 1984, also shows a tire casing buffing apparatus.

Schelkmann, in British Patent No. 1,552,841, filed Oct. 7, 1976, illustrates a tread molded with a network of passages to assist in the evacuation of gaseous inclusions between the tread internal surfaces and the layer of bonding rubber on the prepared tire carcass. This patent further describes a method of coating the internal surface of the tread with unsaturated rubber to prevent deterioration of the tread internal surfaces during storage.

Blankenship, in U.S. Pat. No. 3,925,129, issued Dec. 9, 1975, describes a tire retreading system utilizing a tread strip. The patent emphasizes the importance of removal of trapped air.

SUMMARY OF THE INVENTION

A method of buffing a precured tire tread according to the present invention comprises providing an apparatus capable of buffing the casing engaging surface of said tread such that grooves formed by said buffing angularly intercept a tread edge, mounting said tread in said apparatus, and buffing. In one embodiment, the tread may be provided in an annular configuration.

In the illustrated embodiment, the method of buffing may be employed by turning an annular tread inside out such that the radially inner surface of the tread is radially outward and the ground engaging tread surface is radially inward. The tread is mounted over an axially rotatable drum and a tension mechanism such that the tread is centered in and supported by the drum. The mounted tread is placed in tension by stretching the tread to a predetermined circumferential length. The drum is then rotated at a predetermined angular velocity. A tread buffing wheel is axially rotated to a predetermined angular velocity. The buffing wheel is then placed in contact with the rotating tread, the buffing wheel axis of rotation being angularly positioned relative to the axis of rotation of the drum. The surface of the tread is buffed to a predetermined roughness with grooves extending axially to a tread edge. The rotating buffing wheel is then removed from tread contact. The tread is removed from the drum and tension mechanism, and a bonding cement is applied to the buffed surface of the tread. The cemented surface is then covered with a polyethylene liner, and the tread surface is then turned radially outward.

The method may further comprise the step of rotating a second buffing wheel at an equal but opposite predetermined angular velocity, the pair of wheels creating grooves starting at a centerplane of the tread and extending to a respective tread edge.

Another method of buffing an annular tread includes the step of using three buffing wheels, the three buffing wheels comprising a center tread buffing and two equal, but axially displaced, tread edge buffing wheels, the tread edge buffing wheels being rotated at an equal but opposite angular velocity, creating lateral grooves adjacent to the center grooves created by the center tread buffing wheel and extending from said center grooves to a respective tread edge.

In an apparatus for buffing an annular tread according to the present invention, comprising a frame, a means for supporting the tread, a means for stretching the tread, a center tread buffing means, a main drive, a pair of tread edge buffing means, and a means for rotating the tread edge buffing means. The means for supporting the tread is axially rotatable and mounted to the frame. The means for stretching the tread is axially rotatable and has an axis of rotation parallel to the axis of rotation of the means for supporting the tread. The center tread buffing means has a curved surface capable of being brought into contact with the tread for buffing an inner tread surface. The buffing produces brush marks of substantially even depth. The main drive means for rotating the mounted tread about one or more axis also rotates the center tread buffing means. The pair of edge buffing means for buffing the edges of the tread with brush marks that are of substantially even depth and extend axially outward are rotated by the means for rotating the edge buffing means.

DEFINITIONS

The invention also may be better understood in the context of the following definitions, which are applicable to both the specification and the appended claims.

"Axial" is used herein to refer to lines or directions that are parallel to the axis of rotation of the casing or wheel.

"Buffed" means a procedure whereby the surface of an elastomeric tread or casing is roughened. The roughening removes oxidized material and permits better bonding.

"Center plane" means the plane perpendicular to the axis of rotation of the tread and passing through the axial center of the tread.

"Casing" means the casing, belt structure, beads, sidewalls, and all other components of the tire including a layer of unvulcanized rubber to facilitate the assembly of the tread, the tread and undertread being excluded. The casing may be new, unvulcanized rubber or previously vulcanized rubber to be fitted with a new tread.

"Equatorial plane (EP)" means the plane perpendicular to the axis of rotation of the casing or wheel and passing through the center of the crown area of the casing.

"Pneumatic tire" means a laminated mechanical device of generally toroidal shape (usually an open torus) having beads and a tread and made of rubber, chemicals, fabric and steel or other materials. When mounted on the wheel of a motor vehicle, the tire through its tread provides traction and contains the fluid or gaseous matter, usually air, that sustains the vehicle load.

"Replacement tread" as used herein refers to a premolded and precured tread.

"Retreading" means the procedure of refurbishing a tread worn tire by removing the old tread and replacing it with a precured tread or a "hot capped" tread.

"Radial" and "Radially" are used to mean directions radially toward or away from the axis of rotation of the casing or wheel.

"Tread" means a molded rubber component which, when bonded to a tire casing, includes that portion of the tire which comes into contact with the road when the tire is normally inflated and under normal load.

"Wings" means the radial inward extension of the tread located at axial extremes of the tread, the inner surface of the wing being an extension of the tread edge.

DETAILED DESCRIPTION OF THE INVENTION

A method of buffing a precured tire tread having a ground engaging surface and a casing engaging surface is described herein. The method comprises the steps of providing an apparatus capable of buffing the prepared casing engaging surfaces of said tread such that grooves formed by said buffing angularly intercept a tread edge, mounting the tread in said apparatus, and buffing.

The method may include the step of preforming the tread into annular configuration and may be carried out with flat treads or treads with axial extending wings.

The method of buffing may also be performed by turning the annular tread inside out such that the radially inner surface of the tread is radially outward prior to mounting the tread in the apparatus. The angular displacement of the grooves relative to the centerplane of the tread may be between 1° and 179°. Preferably, 15° to 165° is recommended, with 90° providing the shortest and most direct route for gases to vent to a tread edge.

The method herein described can be used to prepare an annular or arcuately shaped tread as described in copending application Ser. No. 07/549,523, incorporated herein by reference.

Figure 1:
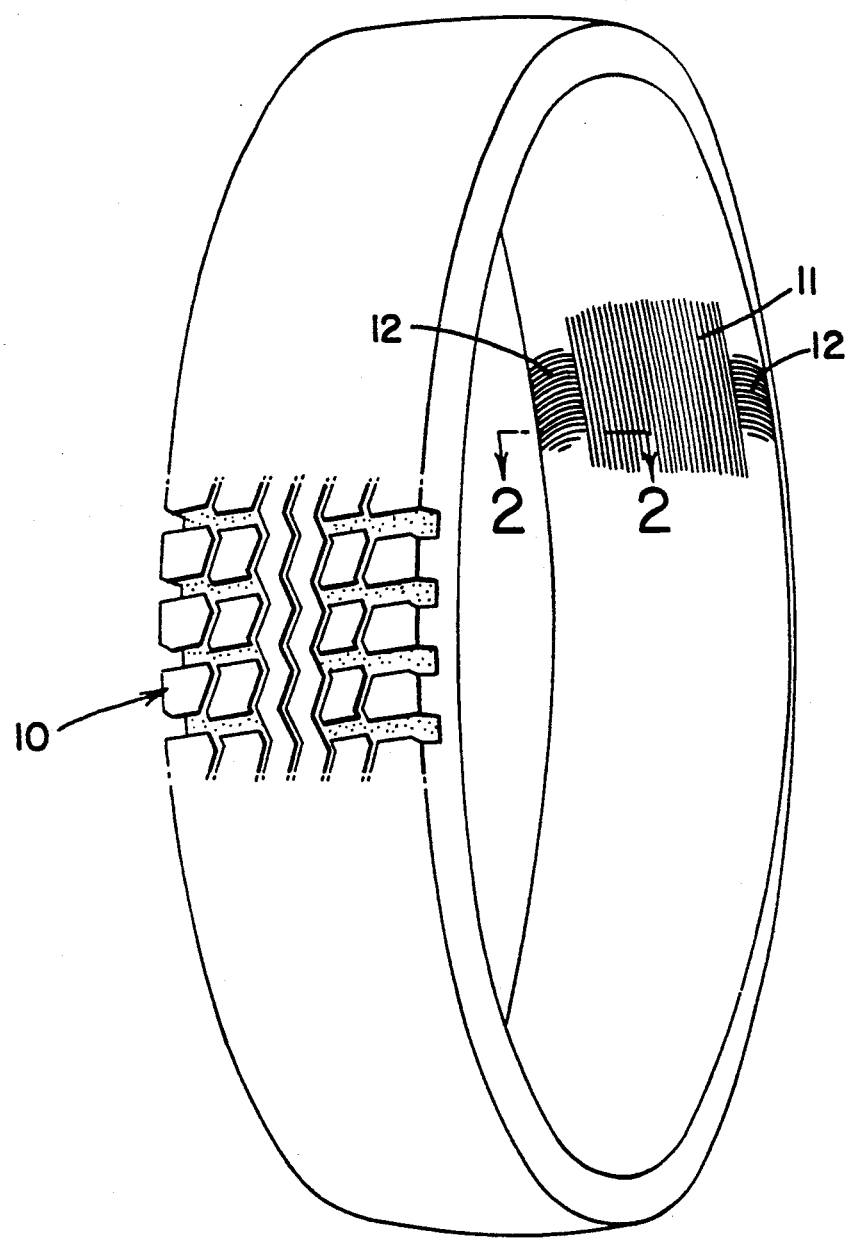
FIG. 1 illustrates the annular tread with the inner surfaces buffed.
Figure 2:
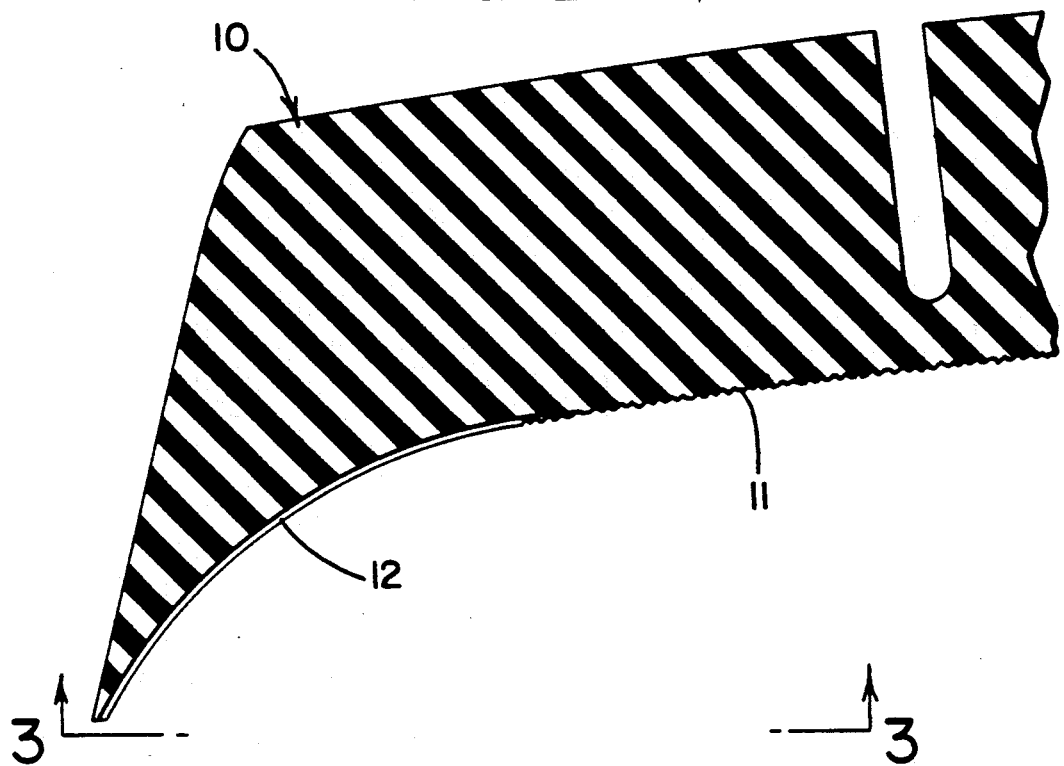
FIG. 2 is a partial cross sectional view of the buffed annular tread.
Figure 3:
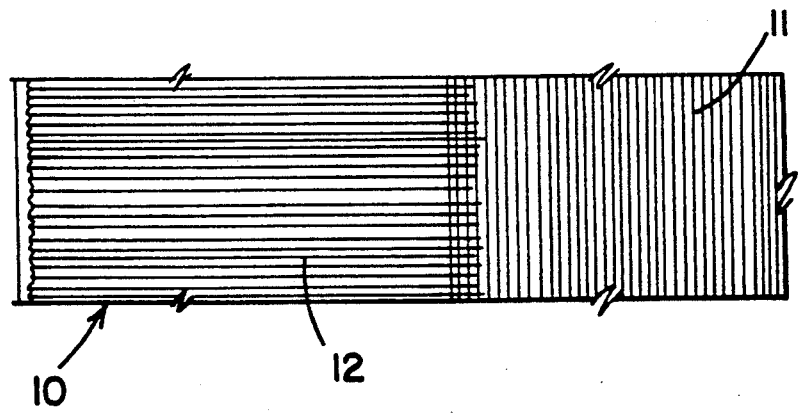
FIG. 3 illustrates a view of the tread buffed surfaces depicting the direction of surface roughening.

In the drawings, the same numerals are used to designate the same components or items in the several views. With particular reference now to FIGS. 1-3, an annular buffed tread 10 is illustrated. FIG. 2 illustrates a cross sectional view of the buffed tread 10. FIG. 3 is a view of the buffed inner tread surface.

FIGS. 1 through 3 all illustrate a direction of buff whereby the buffing creates circumferential grooves at the center tread inner surface 11 and axial grooves at the wing inner tread surface 12.

Figure 4:
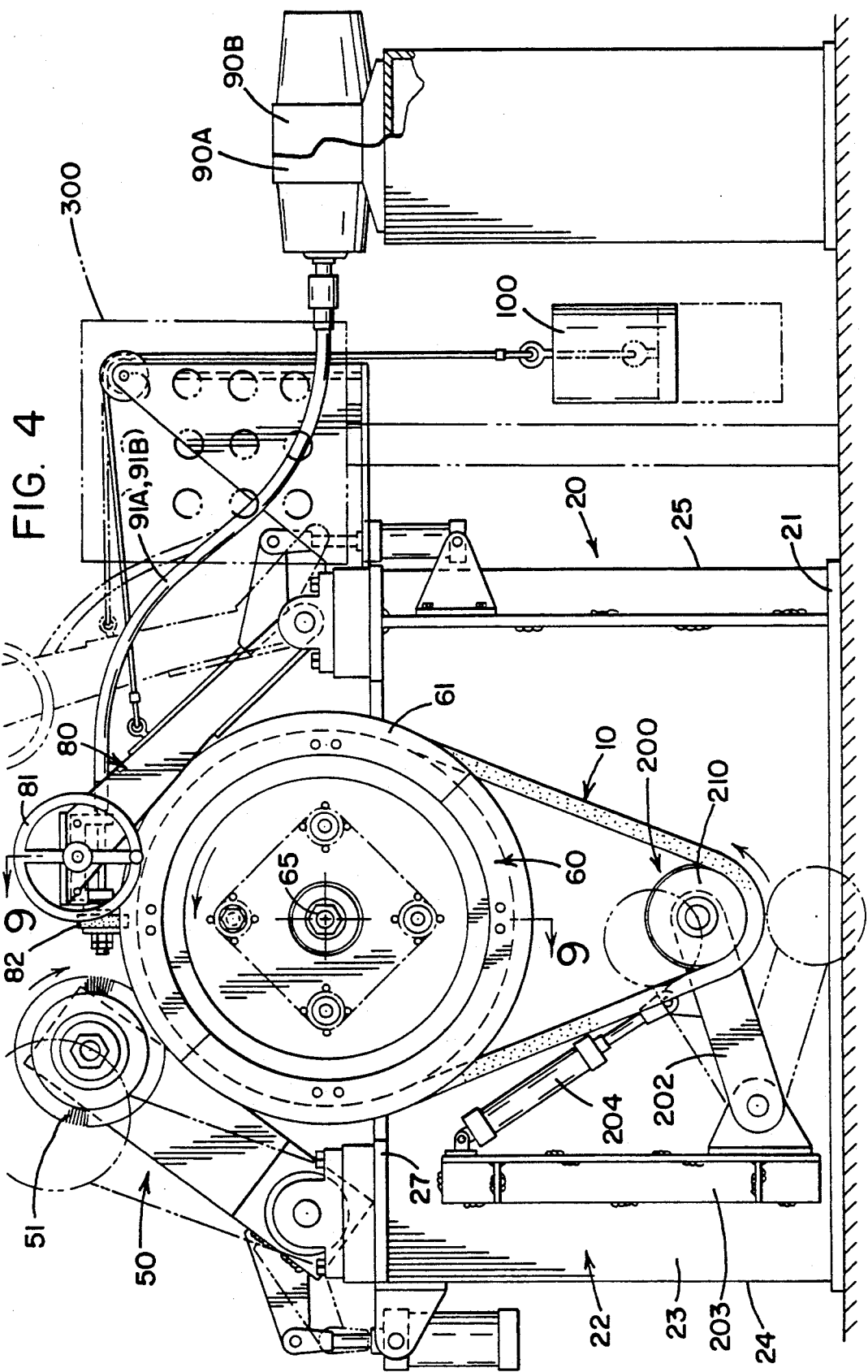
FIG. 4 illustrates the tread mounted on the buffing apparatus.

FIG. 4 illustrates the tread buffing apparatus which is made up of several subcomponents or elements. These elements are supported by a frame 20. The frame 20 may be constructed of any material with sufficient strength to support the weight and operation of the buffing machine.

Figure 5:
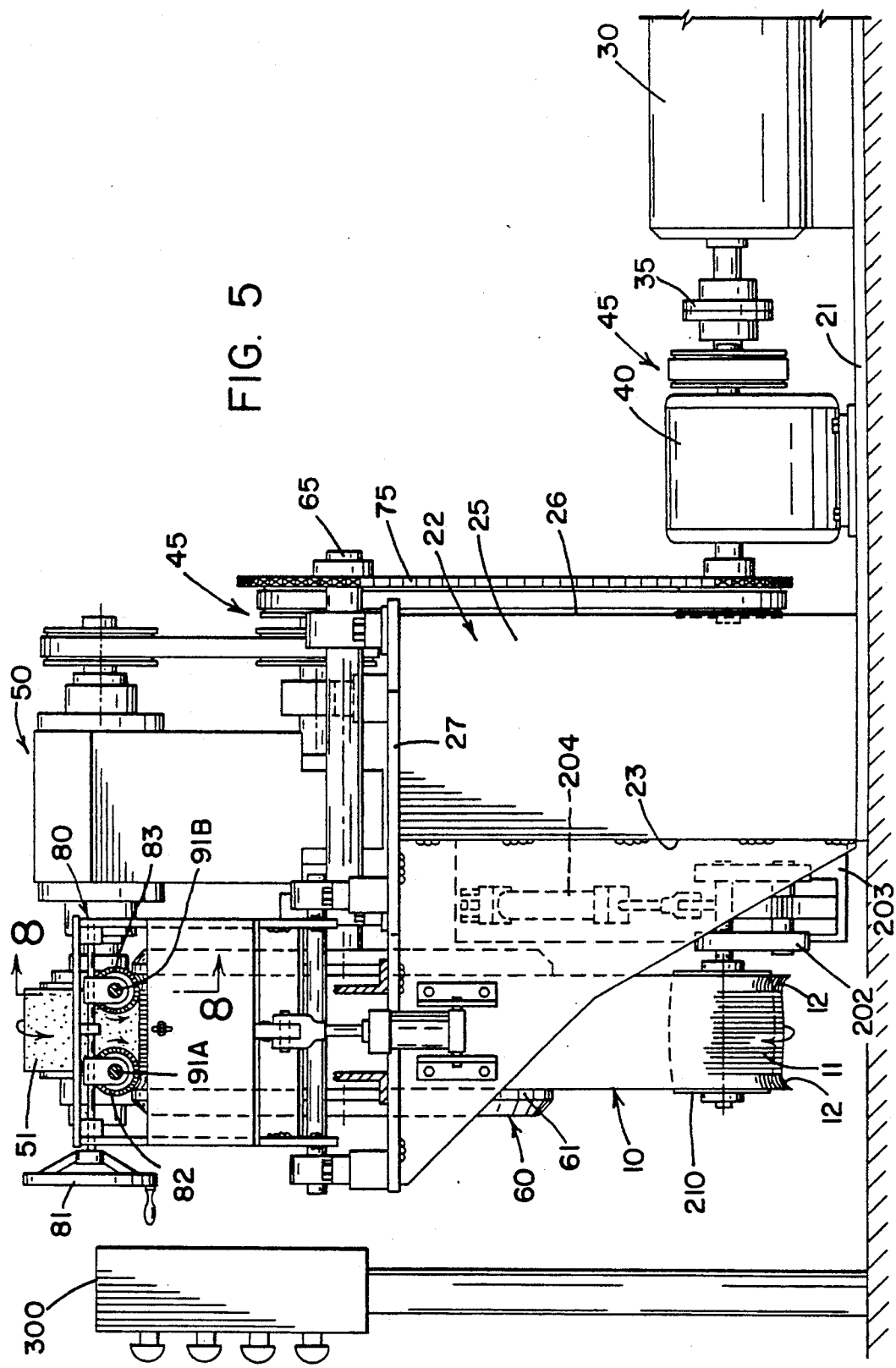
FIG. 5 is an end view of the tread mounted on the buffing apparatus.

As illustrated in FIG. 5, the frame 20 comprises a horizontal base plate 21. A main frame enclosure 22 is mounted to the base plate 21. The enclosure 22 consists of four vertical side members 23,24,25,26, respectively, and a top plate 27 mounted to the enclosure 22 are the various buffer subcomponents or elements. Also fixedly attached to the base plate are the main drive motor 30 and gear reduction box 40. The main drive motor 30 is connected to gear reduction box 40 by a shaft and clutch coupling assembly 35. The gear reduction box 40 is connected to the main enclosure by a series of pulleys and belts 45.

Figure 6:
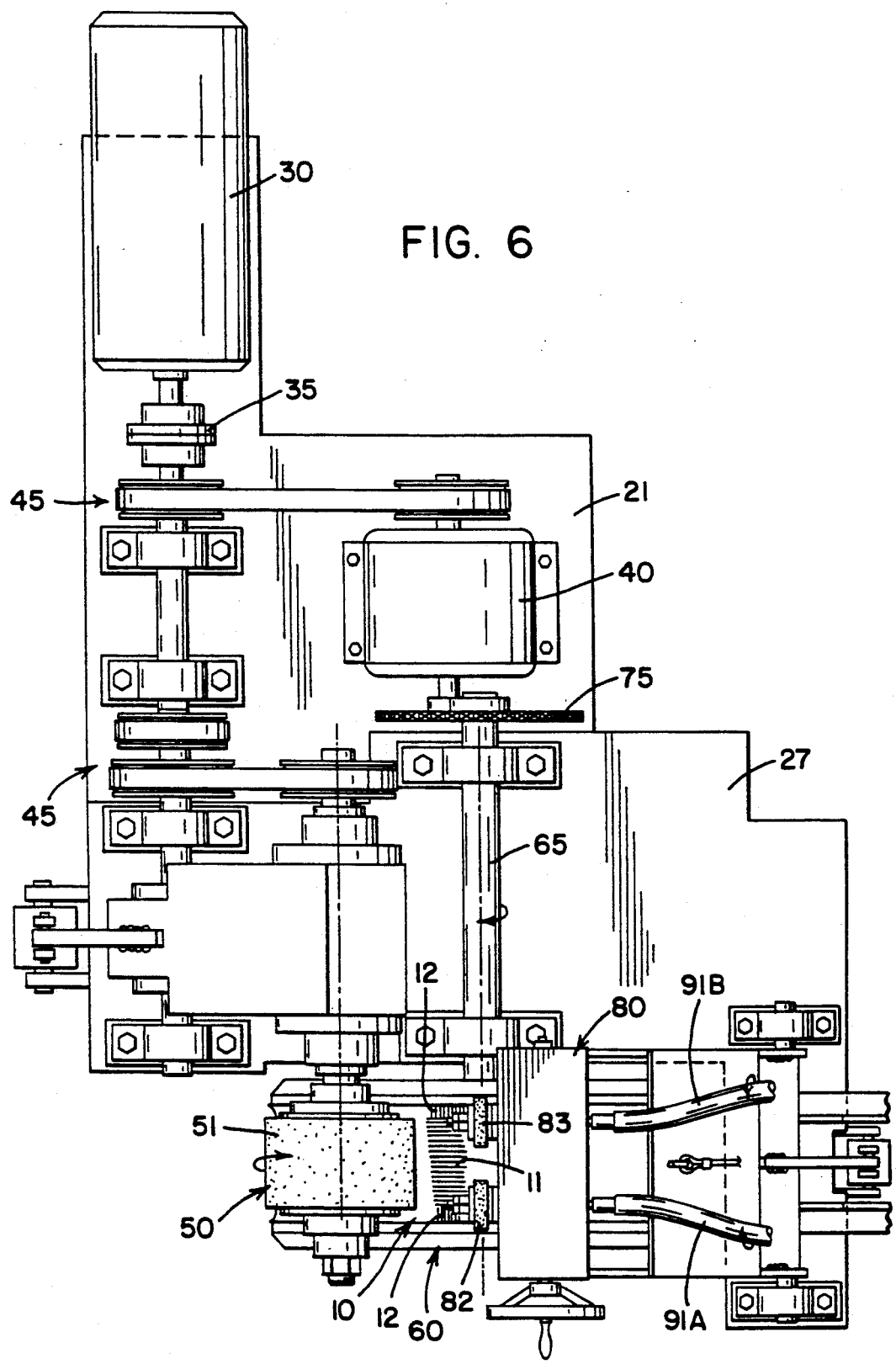
FIG. 6 is a plan view of the buffing apparatus with tread mounted.

With reference to FIG. 6, the main drive motor 30 provides rotational movement for the center tread buffer assembly 50 and tread support drum 60. A rotation speed reduction is accomplished such that the drum 60 rotates at an angular velocity or rpm substantially less than the center tread buffing assembly 50. This rpm ratio is accomplished through the gear box assembly 40 and the belts and pulleys 45 which are connected to the drum shaft 65 by a belt 75. Also pivotally mounted to the enclosure 22 is the wing buffing assembly 80. The wing buffing assembly buffs the inner surface of the tread at the tread edge, the wing inner tread surface 12 being an axial extension of the tread and including the tread edge. The wing buffer assembly is powered by two 7½ hp. motors 90A and 90B (shown in FIG. 4). The motors are connected to the wing buffer assembly by two flexible drive shafts 91A and 91B. The wing buffer assembly is counterbalanced by weight 100 as can be seen in FIG. 4.

With reference to FIG. 4, the tread 10 is shown mounted over the tread support drum 60 and a tension roller assembly 200. The tension roller assembly 200 is pivotally attached to the enclosure 22. The tension roller 210 is attached to a tension roller support arm 202. The support arm 202 is attached to a bracket 203 which is welded to the enclosure 22 at side 23. The support arm 202 is pivotally attached to the bracket 203. The tension roller 210 is pivoted by actuating a cylinder 204 which is pivotally fixed to bracket 203 and support arm 202. As the cylinder 204 extends, the tension roller 210 axis of rotation is moved, increasing the distance between the axis of rotation of the drum 60 and the tension roller 210 axis. This relative movement increases the tension on the tread 10.

With reference to FIGS. 5 and 6, the center tread buffing wheel 51 is rotated in a clockwise rotation while the tread 10 is slowly rotated in a counterclockwise direction. The center tread buffing wheel roughens the inner tread surface creating visually observable circumferential grooves 11. Also depicted is the wing buffing assembly 80. The wing buffing assembly shows two oppositely rotating wing buffing wheels 82 and 83, respectively. These wheels are rotated in opposite directions such that the wings are buffed under a tensile scrubbing action. The wing wheels 82,83 are mounted to a second support arm 80. The wing wheels 82,83 are axially movable and are spaced equidistant from the equatorial plane of the drum 60. The wing wheels 82,83 have an axis of rotation perpendicular to the axis of rotation of the drum 60. The wing wheels 82,83 can be axially moved by turning a wing buffer axial adjustment unit 81.

When buffing a tread, the wing adjustment unit 81 is turned until the wing wheels 82,83 make firm contact with the tread 10. As can be seen in FIGS. 5 and 6, and as specifically depicted in views 2 and 3 of the tread, the buffing action of the center tread buffing wheel creates circumferential lines 11 along the tread's inner surface, whereas the wing buffing action creates lines that extend outwardly from the centerplane of the tread at the wing inner surfaces to a tread edge. These wing buffing lines create small air passages that assist in the evacuation of trapped air when the tread is mounted to a prepared tire casing. The removal of entrapped air is important if adequate bonding of the tread to the casing is to be accomplished. The present method of buffing a tread provides direct passageways for the removal of entrapped air at the inner surfaces of the wings while also improving the bonding characteristic of the tread by removing oxidized rubber.

Previous buffing methods created only circumferential grooves or lines. These circumferential lines in effect create air traps. Conventional stitching of the tread to the casing while removing most of the air could not remove the air trapped by the buffing lines, and as a result, vent cords were sometimes used as a means to allow air to be removed during curing of the tread to the casing. The present invention minimizes the amount of air entrapped by ensuring that the wing inner surfaces are roughened such as to act as vents enabling the air to escape from under the tread at these areas. Utilizing this method of buffing a tread requires no vent cords. In an alternative embodiment, the entire inner surface of the tread could be buffed such that all the buff lines are perpendicular to the tread centerplane. Such buffing would enable all air to flow radially outward, thus substantially eliminating entrapped air.

Figure 9:
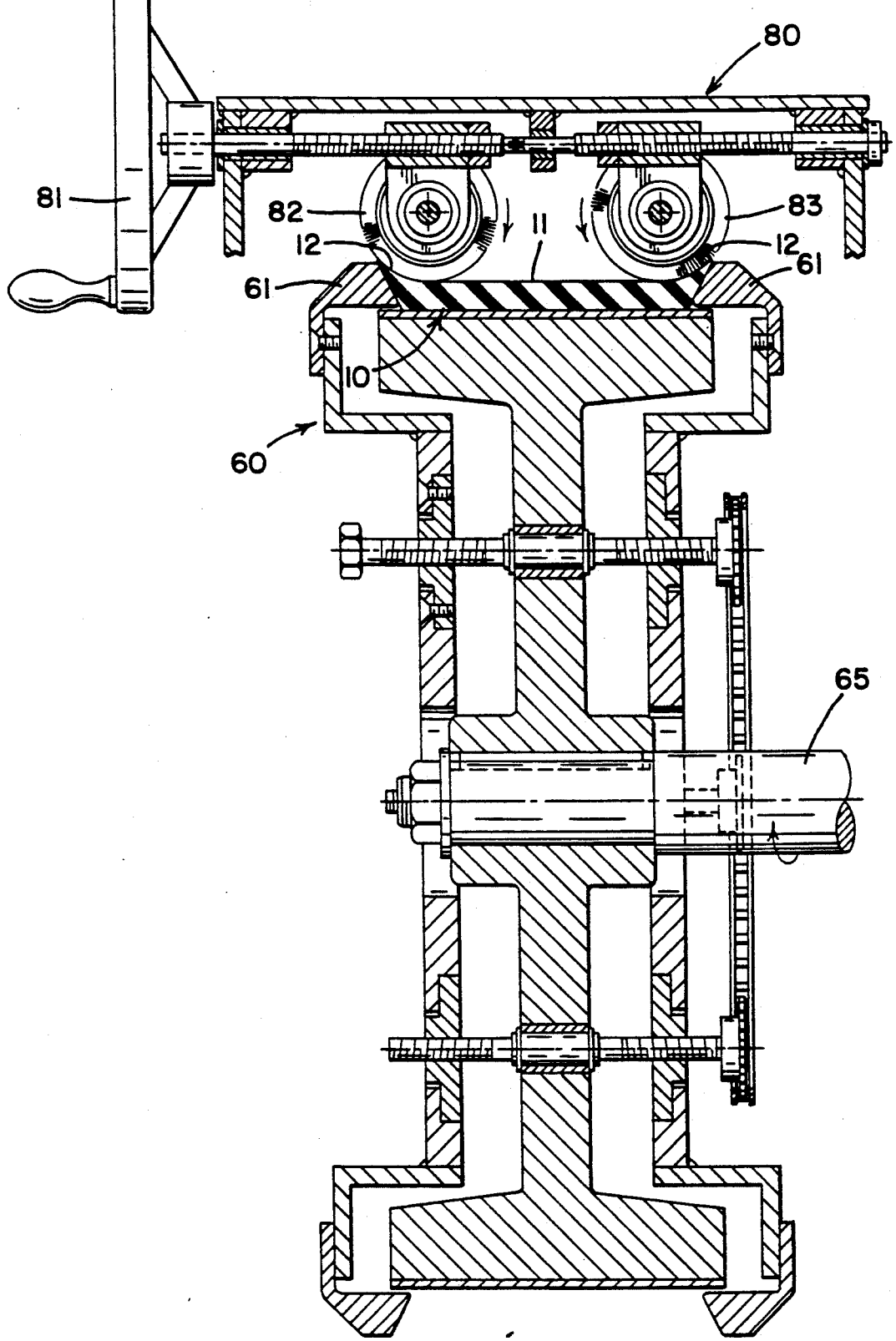
FIG. 9 is a cross sectional view of the drum assembly and the wing buffing assembly with the axial adjustment capability of each depicted, the view taken on lines 9—9 of FIG. 4.

In the illustrated embodiment, as illustrated in FIG. 9, the tread is supported by the drum 60. The drum 60 includes wing supports 61 and a means for adjusting the axial spacing of the wing supports 61. The wing supports 61 are axially adjustable such that various tread width sizes can be accommodated. The tread upon being turned inside out such that the ground engaging surface faces radially inwardly and the inner surface is displaced radially outwardly is mounted on the drum 60 and over the tension roller assembly 200. The inner tread surfaces are thus exposed to facilitate the buffing procedure. The tread is supported and centered by the drum 60. The drum wing supports 61 are spaced to accommodate the tread width and provide a rigid support for the flexible tread wing. An alternative embodiment utilizes a conformable pneumatic wheel to support the tread and wings in place of the rigid drum with wing supports. The tread wings are supported such that the rotating wing buffing wheels 82,83 can roughen the wing surfaces 12. The wing supports 61 are designed such that the curvature of the inner surface of the wing is maintained, the curvature of the tread wing being a radius of 1.0 to 2.0 inches. In the illustrated embodiment, the tread curvature is 1.5 inches. The wing buffing wheels have a radius matching that of the tread wing curvature. In the illustrated embodiment, 3.0 inch diameter wire wheels having a 1.5 inch radius were used. The selection of a matching radius enable the rotating wing buffing wheels 81,82 to contact the entire wing curvature as the tread rotates on the drum. Complete buffing contact to the tread edge is thus achieved.

The tread when mounted over the drum 60 and the tension roller assembly 200 is placed in tension by actuating a means for moving the tension roller relative to the axis of rotation of the drum. As illustrated in FIG. 4, in the illustrated embodiment, the means for moving the tension roller is a pneumatic cylinder 204. The tread is stretched to a predetermined circumferential length, the stretched length being such that the tread when so mounted over a circumferentially curved drum exhibits no cupping. Cupping is defined as an irregular surface caused by thick tread lugs and a thin inner tread. Cupping of the tread causes the buffing wires of the center tread buffing wheel 51 to deflect, or bend over, when the portion of inner tread directly over a lug passes under the buffer. The inner tread between tread lugs is unsupported by the drum, but by stretching the tread over a curved drum, the tread lugs pull the inner tread between the lugs in circumferential tension. This tension causes the unsupported inner tread between lugs to stay in contact with the buffing wires, thus enabling a uniform center tread buff to be achieved. The radius of the drum must be large to reduce the effect of curvature at the tread lugs and to minimize buffing wires from deflecting and bending over in this region. This phenomena causes a non-uniform buff. By placing the tread over a large diameter drum and applying appropriate tension, the problem of cupping is substantially eliminated.

The drum diameter should be as large as possible, preferably a minimum of 20.0 inches. In the illustrated embodiment, the diameter is 30.0 inches. The recommended amount of stretch depends on the tread style being buffed. Typically, a tread stretch increasing the circumferential length by 10% is used. In addition to being circumferentially curved, the drum center tread support area may have a slight concave or convex curvature in the axial direction.

To assist in maintaining the tread centered, the tension roller 210 is shaped with a center diameter and two diametrically equal respective end diameters, the center diameter being larger than the end diameters.

Figure 7:
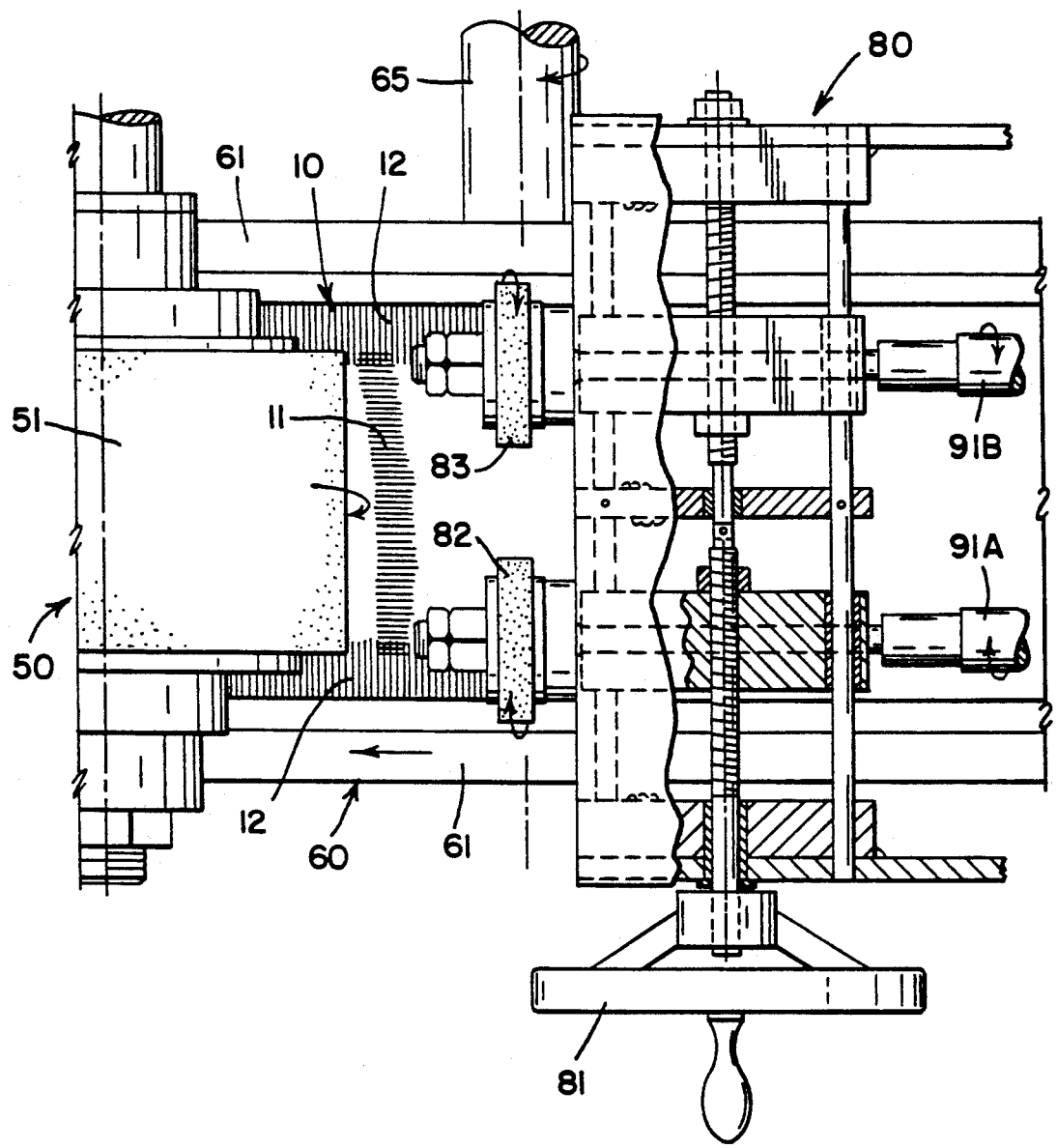
FIG. 7 is a plan view specifically highlighting the wing buffing wheels, the center tread buffing wheels, and the direction of surface roughening of the tread.
Figure 8:
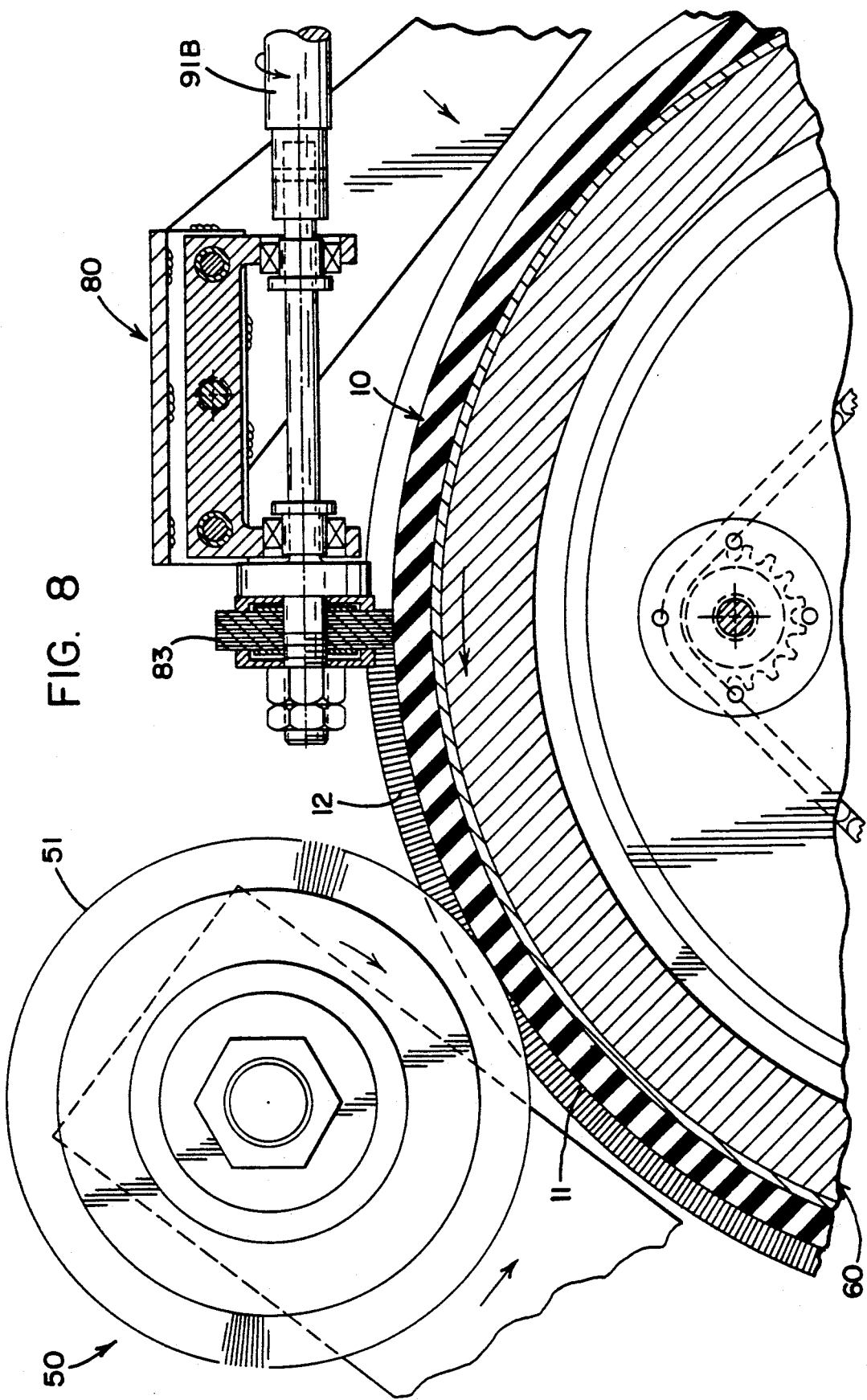
FIG. 8 is a cross sectional view of the wing buffing assembly, the tread mounted on the drum and the center buffing wheel and support art, the view taken on lines 8—8 from FIG. 5.

With reference to FIGS. 7 and 8, a detailed illustration of the tread being buffed is shown, the direction of rotation being clearly exhibited as well as the buff lines on the mounted tread.

Figure 10:
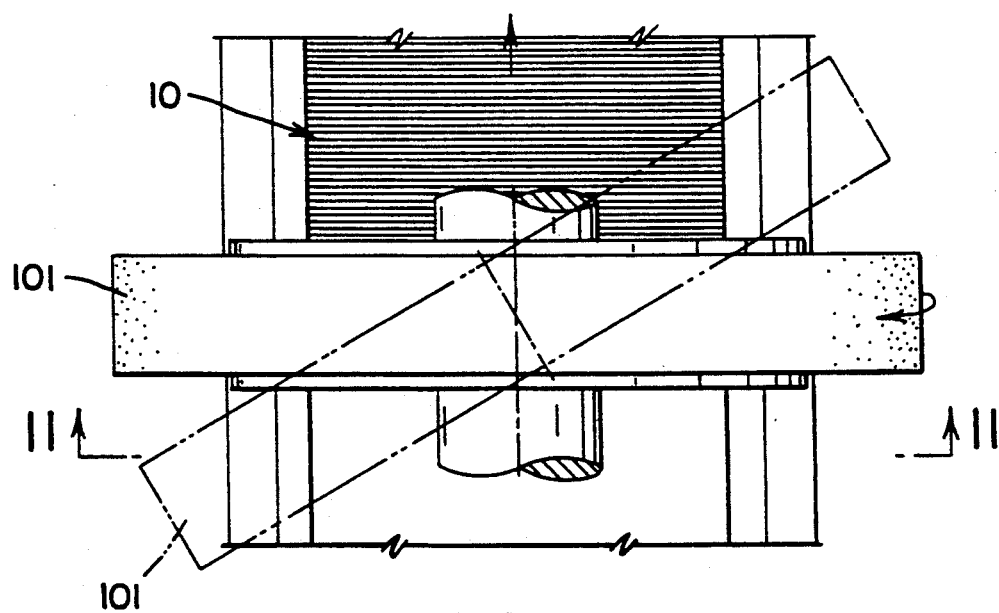
FIG. 10 illustrates a plan view of a tread being buffed by a single buffing wheel.
Figure 11:
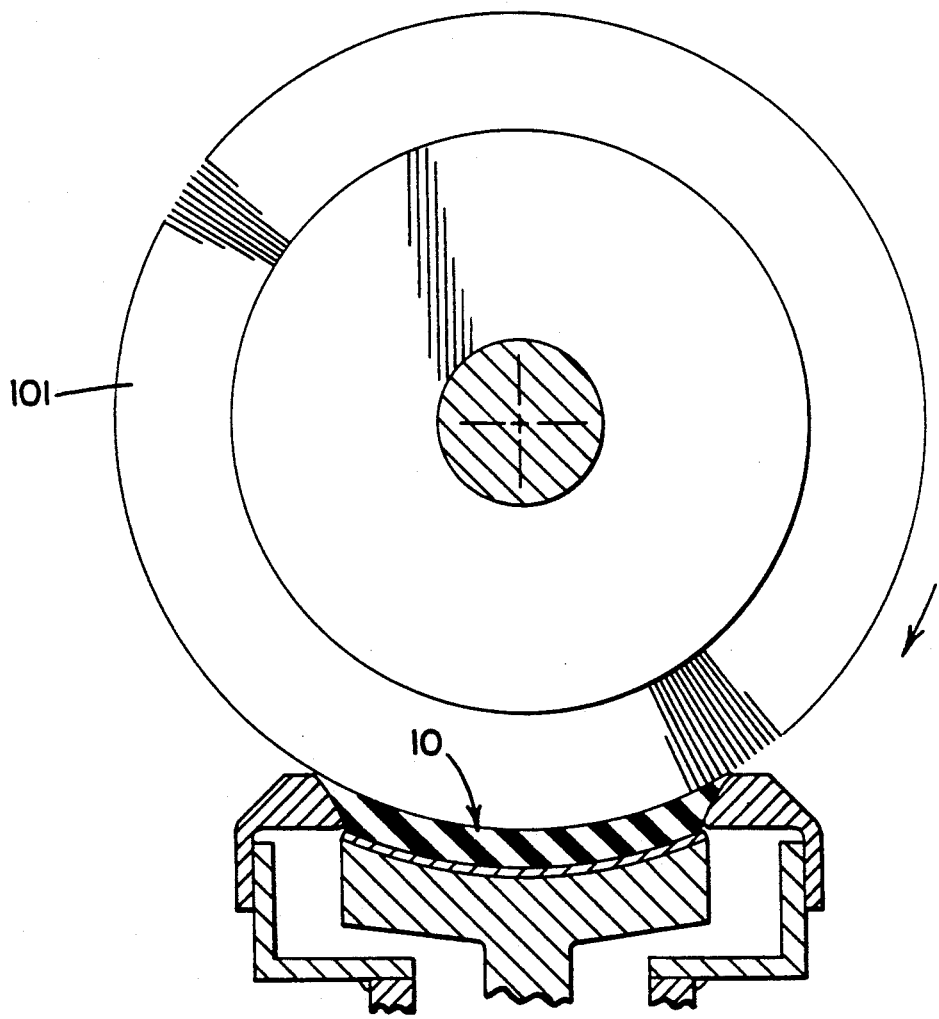
FIG. 11 is a side view of a single buffing wheel as shown through line 11 in FIG. 10.

FIGS. 10 and 11 illustrate a tread 10 being buffed by a single buffing wheel 101, the buffing wheel 101 forming grooves that extend from one tread edge to the opposite tread edge. The illustration depicts the grooves perpendicular to the centerplane of the tread 10 and the tread's direction of travel. In FIG. 10 "dashed" or phantom lines depict the wheel 101 angularly displaced such that the grooves would not be perpendicular to the centerplane of the tread but would extend from tread edge to tread edge. This angular displacement of the buffing wheel 101 is considered within the scope of the invention. The wheel 101 could be displaced from 1° off perpendicular to the centerplane of the tread to 179° such that the grooves achieve a fine screw thread configuration to reach a tread edge to tread edge connection, the buffing wheel being sized diametrically to make contact with the inner surfaces of the tread, the diameter being in relationship with the angle and curvature of the buffed surfaces. A range of angular displacement of 15° to 165° is recommended, thus creating a shorter route for the venting of entrapped air. A 90° positioning of the wheel relative to the centerline of the tread provides the ideal, i.e. shortest or least restrictive distance for gases to vent.

Figure 12:
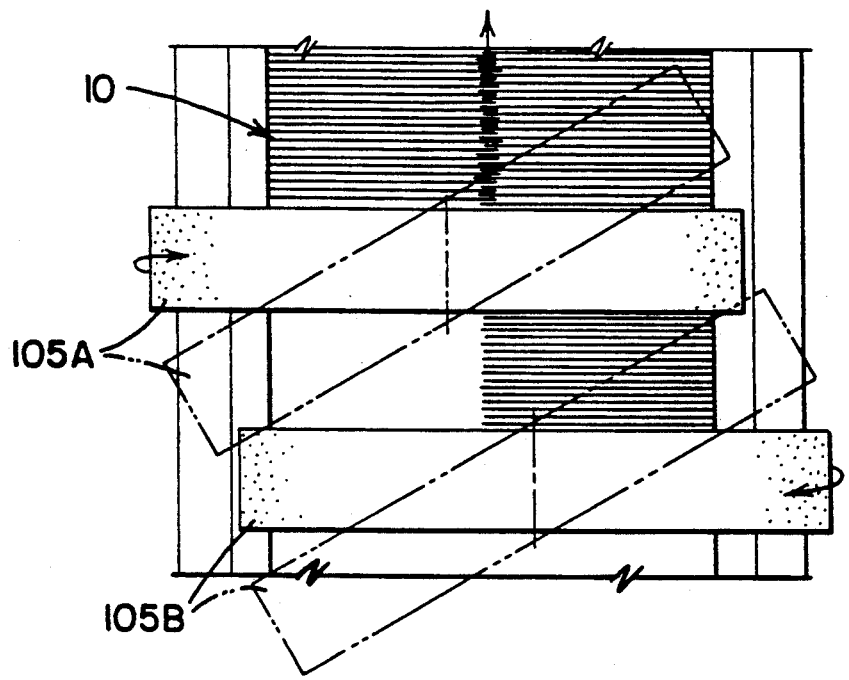
FIG. 12 illustrates a plan view of a tread being buffed by a pair of oppositely rotating buffing wheels.

FIG. 12 illustrates a tread 10 being buffed by two oppositely rotating buffing wheels 105A,105B, each wheel buffing from the centerplane of the tread and extending to a respective tread edge. As in FIG. 10, the phantom or "dashed" line depiction of the wheels 105A, 105B showing angular positioning of the buffing wheels is possible while maintaining center to tread edge air evacuation via the formed grooves. The pattern or texture of the buffed surface can be as shown in FIG. 12 or may be a chevron configuration.

Figure 13:
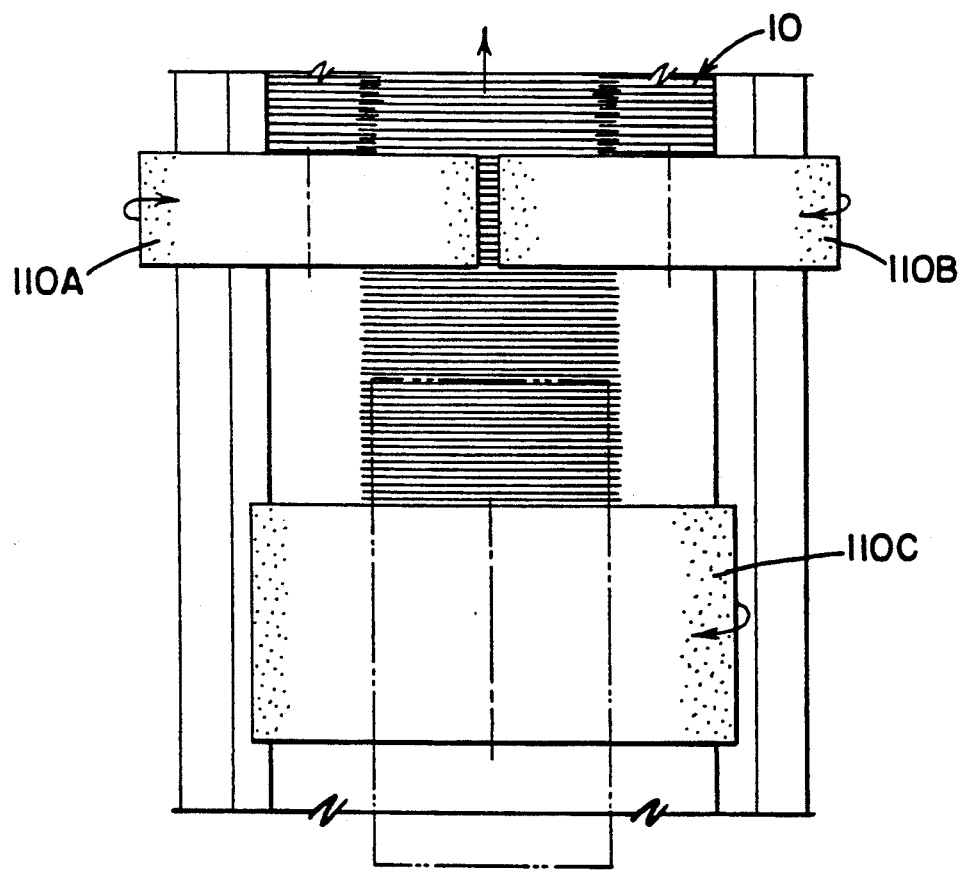
FIG. 13 illustrates a plan view of a tread being buffed by three buffing wheels, two oppositely rotating tread wing edge buffing wheels and a center tread buffing wheel.

FIG. 13 depicts a three buffing wheel method whereby the tread edges are buffed by two oppositely rotating tread edge buffing wheels 110A,110B, and the center of the tread is buffed by a third wheel. The third wheel 110C is depicted forming grooves transverse to the tread's centerplane and overlapping the grooves formed by the wing edge buffing wheels 110A,110B. A phantom line depicts the fact that the third buffer 110C can be positioned in line with the tread direction of rotation. This orientation is similar to the embodiment illustrated in FIGS. 4 through 9.

The apparatus described herein can be used to buff a precured annular tread in the following manner.

A tread is turned inside out such that the radially inner surfaces of the tread and wings are radially outward, and the ground engaging tread surface is radially inward. The tread is then mounted over an axially rotatable drum and a tension roller mechanism such that the tread and the wings are centered in and supported by the drum. The tension roller is then moved relative to the drum's axis of rotation, thereby putting the mounted tread in tension. In the illustrated embodiment, the tension roller is pivotally supported on a support arm which is mounted to the frame, the support arm being moved by a pneumatic cylinder. The pneumatic cylinder stretches the tread to a predetermined circumferential length, the length being such that the inner surface of the tread can be buffed without exhibiting cupping. The operator then activates a switch starting a main drive motor. The main drive motor is attached to the drum by a series of belts and pulleys, the main drive motor providing counterclockwise rotation of the drum. The drum is rotated to a predetermined buffing speed. The main drive motor is further connected to a center tread buffing wheel by a series of belts and pulleys and provides axial rotation of the center tread buffing wheel at a speed higher than the rotation of the drum, the speed of the drum being set in the range of 10-17 rpm. In the illustrated embodiment, the rotation was set at 15 rpm. The center tread buffer is mounted to a support arm and rotates at approximately 1,500 rpm. By actuating pivotal rotation of the support arm, the center tread buffing wheel is pivoted until the buffing wheel is in contact with the inner tread surface, the buffing wheel being rotated in a clockwise motion at approximately 1,500 rpm.

The wing buffing wheels are brought up to a predetermined buffing speed, then actuation of pivotal rotation of a second support arm occurs. The second support arm containing the two axially movable rotating buffing wing wheels. The wing wheels are spaced equidistant from the equatorial plane of the drum and have an axis of rotation perpendicular to the axis of rotation of the drum. Each wheel is rotated in the opposite direction relative to the other such that the wings are buffed under a tensile scrubbing action. The wing buffing wheels are pivoted until the wheels come into firm contact with the tread wing surface. The wing buffer axial adjustment unit is turned until the rotating wing wheels make firm contact with the tread wing surfaces. The tread is buffed to a predetermined roughness. In the illustrated method of buffing, the wing buffing wheels are axially spaced prior to buffing such that proper contact with the tread wing surfaces can be made without requiring axial adjustment. Buffing tension is measured by monitoring the motor amperage setting of the main drive motor and of the wing buffing motors. The motor amperage required for proper buffing is in the 30–50 amp range, preferably 40 amps. In the above described method, the center tread buffing wheel contacts the tread 5–15 seconds prior to the wing buffer contacting the tread wing surfaces. In the illustrated method, the center tread buffing wheel contacts the tread 10 seconds prior to the wing buffing wheels contacting the tread wing surfaces. The center tread buffing wheel contacts the tread during buffing for a total period of 40–60 seconds duration, preferably 50 seconds. After the buffing cycle is completed, the buffing wheels are pivotally moved from tread surface contact. The wheel rotation is stopped, and the tension roller mechanism is axially moved toward the drum, thus reducing the tension on the tread. The tread is inspected for proper buff, and upon finding that the tread buffing is appropriate, the tread is removed from the drum and tension roller.

Prior to turning the tread right side out, the operator may apply a bonding cement to the buffed surface of the tread immediately after removing the tread from the buffing apparatus. Preferably, the cement is applied while the tread is stretched on an adhesive application machine. After applying cement to the buffed surface, the cemented surface is covered with a polyethylene liner. The liner protects the cemented surfaces and facilitates storage of the finished treads. The liner is removed just prior to assembly to a prepared casing. The tread is then turned such that the tread surface is radially outward. The tread is then packaged and put into storage until ready to be mounted on a prepared tire casing.

The method described above may be carried out in association with an apparatus comprising an axially rotatable drum adapted for receiving and mounting an annular tread with wings mounted on a frame. The apparatus includes an axially rotatable tension roller mounted to a pivotal support arm. The roller has an axis of rotation parallel to the axis of rotation of the drum. The roller is adapted for receiving the tread and is spaced a distance from the drum. The roller support arm is pivotally movable such that the distance between the drum and the roller can be increased, thereby providing a tensile force on the mounted tread. A means is provided for pivoting the tension roller. A center tread buffing wheel mounted to a pivotally movable buffer support arm and a means for pivoting the buffer support arm relative to the drum are provided A further means for axially rotating the drum and the center tread buffing wheel includes a rotational reduction ratio means such that the center tread buffing wheel moves at a higher RPM than the drum. A pair of axially rotatable wing buffing wheels are provided The wing buffing wheels are spaced at a distance approximating the tread wing spacing and positioned such that the axis of rotation of the wing buffing wheels is perpendicular to the axis of rotation of the drum. A pair of drive means rotates the wing buffers such that the rotation is clockwise for one wing buffer and counterclockwise for the other wing buffer. Both wing buffers are rotated such that the wing buffers contact the tread inner wing surfaces and buff perpendicular to and away from the centerplane of the mounted tread. A means for controlling the buffing of the tread is provided such that a relatively constant buffing pressure is applied to the tread surfaces being buffed. The means for controlling includes a means for limiting the time of buffing of the center tread and the wing.

The controller means may include a jack screw, the jack screw being rotatable such that a raising of the jack screw lowers the buffing pressure, and conversely, a lowering of the jack screw raises the buffing pressure, the screw rotation being controlled by the control means.

While specific embodiments of the invention have been illustrated and described, those skilled in the art will recognize that the invention may be variously modified and practiced without departing from the spirit of the invention. The invention is limited only by the following claims.

What is claimed is:

1. An apparatus for buffing an annular tread with wings comprising:
   (a) a frame;
   (b) a means for supporting the tread including an axis of rotation, said means being axially rotatable about said axis and mounted to the frame;
   (c) a means for stretching the tread being axially rotatable and having an axis of rotation parallel to the axis of rotation of the means for supporting the tread;
   (d) a center tread buffing wheel means having a curved surface capable of being brought into contact with the tread for buffing a casing contacting tread surface creating circumferentially extending center grooves of substantially even depth;
   (e) an electrically powered main drive means for rotating the mounted tread about one or more axes and for rotating the center tread buffing wheel;
   (f) a pair of tread wing edge buffing means for buffing the wings at respective tread edges creating lateral extending grooves that are of substantially even depth and extend axially outwardly to tread edges wherein the pair of the tread wing edge buffing means are mounted to a wing buffer support arm including a means for providing a linear increase or linear decrease in spacing between the pair of the tread wing edge buffing means; and
   (g) a means for rotating the tread wing edge buffing means.

2. An apparatus as in claim 1 wherein the means for supporting the tread is an axially adjustable drum, the drum being rotatable about an axis of rotation and being adjustable in width to accommodate various axial widths of annular treads.

3. An apparatus as in claim 2 wherein the means for stretching the tread is an axially rotatable tension roller mounted to a pivotal roller support arm attached to the frame, the roller having an axis of rotation parallel to the axis of rotation of the drum, the roller being adapted for receiving the tread and being spaced a distance from the drum, the roller support arm being pivotally movable such that the distance between the drum and the roller can be increased thereby providing a tensile force on the mounted tread.

4. An apparatus as in claim 3 wherein the pair of tread wing edge buffing means comprises a pair of axially rotatable wing buffing wheels, the wing buffing wheels being spaced at a distance approximating the tread wing spacing and positioned such that the axis of rotation of the wing buffing wheels is perpendicular to the axis of rotation of the drum.

5. An apparatus as in claim 4 wherein the means for rotating the tread wing edge buffing means comprises a pair of electrically powered drive means, one drive means to rotate each wing buffing wheel, the pair of drive means being such that the rotation of the wing buffing wheels is clockwise for one wing buffing wheel and counterclockwise for the other wing buffing wheel, both wing buffing wheels being rotated such that the wing buffing wheels contact the tread inner wing surfaces and buff perpendicular to and away from the centerplane of the mounted tread.

6. An apparatus as in claim 3 wherein the tread wing buffing means are mounted to a wing buffer support arm, the support arm being pivotally mounted to the frame.

7. An apparatus as in claim 1 wherein the main drive means includes a rotational reduction ratio between the drum and the center buffer wheel of about 1/100, wherein the center buffer wheel turns at about 1,500 rpm, and the drum rotates at abut 15 rpm, the rotational reduction ratio being achieved by a combination of belts and pulleys and a gear reduction box.

8. An apparatus as in claim 7 wherein the wing buffing wheels are rotated at about 2,000 rpm.

9. An apparatus as in claim 7 wherein a controller means regulates buffing pressure by maintaining a constant amperage from each of the three drive means, the main drive and the two-wing buffer drives, the means for controlling the buffing pressure on the tread being such that a relatively constant buffing pressure is applied to the tread surfaces to be buffed, the means for controlling including a means for limiting the time of buffing of the center tread and the winds.

10. An apparatus as in claim 9 wherein the controller means is set at 30 to 50 amps per drive motor.

11. An apparatus as in claim 10 wherein the controller means is set at 40 amps per drive motor.

12. An apparatus as in claim 1 wherein the diameter of the drum is at least 20 inches.

13. An apparatus as in claim 12 wherein the diameter of the drum is equal to 30 inches.

14. An apparatus as in claim 3 wherein the roller is shaped with a center diameter into diametrically equal respective end diameters, the center diameter being larger than the end diameters.

15. An apparatus as in claim 4, wherein the wing buffing wheels are wire brushes being about 3.0 inches in diameter.

16. An apparatus as in claim 12 wherein the drum has a center tread support area which is concavely curved.

17. An apparatus as in claim 12 wherein the drum has a center tread support area which is convexly curved.

18. An apparatus as in claim 2 wherein the drum includes wing supports and a means for adjusting the axial spacing of the wing supports.

* * * * *